United States Patent
Paquay (10) Patent No.: US 9,141,448 B1
(45) Date of Patent: Sep. 22, 2015

(54) LIFETIME MANAGEMENT OF SOCKET RESOURCES

(71) Applicant: GOOGLE INC., Mountain View, CA (US)

(72) Inventor: Renaud Jean Ghislain Paquay, Redwood City, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/058,830

(22) Filed: Oct. 21, 2013

(51) Int. Cl.
  *G06F 15/16* (2006.01)
  *G06F 9/54* (2006.01)
(52) U.S. Cl.
  CPC .................................. *G06F 9/546* (2013.01)
(58) Field of Classification Search
  CPC ........................................................ H04L 29/06
  USPC ........................................................ 709/230
  See application file for complete search history.

(56) References Cited

U.S. PATENT DOCUMENTS 7,508,812 B2 * 3/2009 Stout et al. .................. 370/349
2009/0157882 A1 * 6/2009 Kashyap ...................... 709/227

OTHER PUBLICATIONS

"Chrome.Socket", retrieved on Oct. 21, 2013 from 22 pages.
"Transmission Control Protocol", DARPA Internet Program Protocol Specification, RFC: 793, Sep. 1981, 92 pages.

* cited by examiner

*Primary Examiner* — Andy Ho
(74) *Attorney, Agent, or Firm* — Brake Hughes Bellermann LLP (57) ABSTRACT

A computer implemented method includes determining, by at least one processor executing code segments stored on a non-transitory computer readable medium, if an application is de-activated; and one of killing, by the at least one processor, a socket associated with the application or pausing, by the at least one processor, the socket based on a flag set by the application.

18 Claims, 6 Drawing Sheets

LIFETIME MANAGEMENT OF SOCKET RESOURCES

FIELD

Embodiments relate to lifetime management of sockets and associated resources. More specifically, embodiments relate to lifetime management of sockets and associated resources for processes having brief lifetimes and/or intermittent active lifetimes.

BACKGROUND

Sockets or data sockets enable network-capable applications (e.g., Internet and intranet) to communicate application data (e.g., between applications) across wired and/or wireless communication channels, independent of the network protocol being used. Generally, sockets are implemented through use of an application programming interface (API) configured to allow interaction between an operating system (OS) and an application operating on a computing device. For example, the API may be used to send and receive data over a network using Transmission Control Protocol (TCP) and User Datagram Protocol (UDP) connections.

The API may be, for example, Winsock, Websock or Chrome.socket. Typically, sockets remain open over the lifetime of an application. However, in some cases a socket may be closed, have brief lifetimes and/or be intermittently active regardless of the lifetime of the application. For example, in Websock an idle time setting may be 10 seconds. This idle time setting may be a default setting or be dynamically set. If the application does not use the socket (e.g., send or receive data) the socket may be closed. In other cases, the socket may be closed if an application is minimized and/or if a tab (e.g., in a tabbed browser) the application is operating in is not selected.

Typically the socket is closed to conserve resources. However, closing the socket may degrade a user experience. For example, the user experience may be degraded because a new socket may need to be opened resulting in perceived delays and/or data may not be received or received in a timely manner. As another example of conserving while there is no activity on a socket, an application waiting for connections on a TCP port (e.g. a FTP server, an HTTP server, etc.) using the "listen/accept" socket primitive (also referred to as server socket). In this example, the application, after issuing a "listen/accept" on a given TCP port, could be "unloaded" at any time by the runtime, and "re-loaded" when a client application makes a connection to the port (e.g., to the server socket").

As a result, there is a need to maintain a socket connectivity while also conserving system resources when a socket (being used by an application) is inactive.

SUMMARY

Accordingly, example embodiments provide a mechanism by which resources are conserved on a client machine when a socket is inactive. The mechanism allows an application to specify if a socket is to be closed (or killed, or torn down) if the socket is inactive (e.g., if an application is inactive) or if the socket is to be paused (e.g., resources associated with a socket are released) on the client machine while maintaining the socket open on a remote server.

One embodiment includes a computer implemented method. The computer implemented method includes determining, by at least one processor executing code segments stored on a non-transitory computer readable medium, if an application is de-activated; and one of killing, by the at least one processor, a socket associated with the application or pausing, by the at least one processor, the socket based on a flag set by the application.

Another embodiment includes a computer implemented method. The computer implemented method includes receiving a message from an application, the message including a request to open a socket; reading, from the message, by at least one processor executing code segments stored on a non-transitory computer readable medium, a socket management type; setting, by the least one processor executing, a flag based on the socket management type; and storing information about the socket in a list of sockets, the information including the flag.

Still another embodiment includes a non-transitory computer-readable storage medium having stored thereon computer executable program code which, when executed on a computer system, causes the computer system to perform steps. The steps include determining, by at least one processor executing code segments stored on a non-transitory computer readable medium, if an application is de-activated; and one of killing, by the at least one processor, a socket associated with the application or pausing, by the at least one processor, the socket based on a flag set by the application.

DETAILED DESCRIPTION OF THE EMBODIMENTS

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Furthermore, the figures are intended to illustrate the general characteristics of methods and/or structure utilized in certain example embodiments and to supplement the written description provided below. These figures are not, however, to scale and may not precisely reflect the precise structural or performance characteristics of any given embodiment, and should not be interpreted as defining or limiting the range of values or properties encompassed by example embodiments. For example, the relative positioning of structural elements may be reduced or exaggerated for clarity. The use of similar or identical reference numbers in the various drawings is intended to indicate the presence of a similar or identical element or feature.

A web browser executed by a client device can receive code (e.g., HTML code) from a remote server (e.g., a remote server that hosts a website) and can execute the received code on the client device for the benefit of a user of the client device.

In various implementations, the web browser may include or have installed one or more web applications. In this context, a "web application" may be configured to perform a single task or multiple tasks for a user. In such an implementation, the web application may be configured to be executed or interpreted by the web browser. Thus, web applications can be run inside a web browser with a dedicated user interface, and may provide functionality and an experience that is more rich and interactive than a standalone website but are less cumbersome and monolithic than a desktop application. Examples of web applications include games, photo editors, and video players that are run inside the browser.

Web applications can be "hosted web applications," or "packaged web applications." Hosted web applications can grant a small number of additional permissions to a specific website, such as the ability to use more than the normal quota of temporary storage space, use geolocation features without additional confirmation prompts beyond a single install-time one, and the ability to always have a hidden page open which is performing tasks such as synchronizing data for offline use or receiving server-pushed notifications to display to the user. Hosted web applications also get special treatment in a user interface, in that hosted web applications may be shown with a large icon that can be clicked to launch the application either in a tab or in a standalone (possibly full screen) window.

Installable web applications are a way of making a browser treat certain websites like applications. Many installable web applications are hosted web applications with extra metadata (such as a small manifest file that describes the application). Packaged web applications are a type of installable web applications. Packaged applications can be thought of as web applications whose code is bundled, so that the user can download all of the content of the web application for execution by the browser or in a standalone window. A packaged web application may not need to have network access to perform its functionality for the user, and rather may be executed successfully by the browser locally on the computing device without access to a network.

Packaged web applications have the option of using extension application programming interfaces (APIs), allowing packaged apps to change the way the browser behaves or looks. In some cases, packaged web applications may operate without appearing to run in a browser, e.g., without the browser "chrome", tabs, or other user interface of the browser. In such a case, the packaged web applications would operate in a standalone window without access to content scripts or APIs related to browser state such as cookies, history, bookmarks, open tabs, etc. In various cases, packaged web applications may access USB drives, BLUETOOTH devices, open raw network sockets, act as servers, or access the local filesystem, as examples.

In various examples, the web browser may include or be configured to interact with one or more browser extensions. In this context, a "browser extension" may include one or more web pages packaged or grouped together as a definable whole, and configured to extend the functionality to the web browser. As described herein, "browser extensions" are small software programs that can modify and enhance the functionality of a web browser. They may be written using web technologies such as HTML, JavaScript, and CSS. Extensions may have little or no user interface. In some implementations, extensions may provide a small user interface icon or other user interface that may modify a browser's "chrome", which is defined herein to include an area outside of a webpage displayed in the browser (such as the borders of a web browser window, which include the window frames, menus, toolbars and scroll bars). Selecting the icon or the other user interface may activate the functionality of the extension within the browser.

Thus, browser extensions also provide extra functionality to a browser, but generally, unlike web applications, there is little or no user interface component to the functionality provided by an extension. Instead, browser extensions extend the functionality of the browser and the websites being viewed in it. For example, browser extensions can extend the functionality of the browser by adding a new button to the address bar, such as an ever-present currency converter. Buttons like this can also apply to the current website being viewed—for example, clicking the currency converter button can convert all prices on the website presented to a user into a currency chosen by the user. In another example, an extension can be installed so that when a user hovers a cursor over a thumbnail image on a webpage executed by a browser a larger-size version of the image is displayed until the user moves the cursor away from the image. In another example, and extension may be installed to embed a "mail this" button next to every link in every page.

Extensions may modify websites, for example to block advertisements, to increase a zoom level on pages, or read strings of text and pass those to a text to speech engine for a blind user. A developer may want injected code from an extension to communicate to the rest of the extension. For example, an extension may remove all images from a news website. The extension may establish a communication channel back to the rest of the extension running in its own process in the browser, using a content script. Because content scripts run in the context of a web page and not the extension, they often need some way of communicating with the rest of the extension. For example, an RSS reader extension might use content scripts to detect the presence of an RSS feed on a page, then notify the background page in order to display a page action icon for that page. Communication between extensions and their content scripts works by using message passing. Either side can listen for messages sent from the other end, and respond on the same channel. A message can contain any valid object (e.g., a JSON object such as null, boolean, number, string, array, or object).

"Packaged web applications", in contrast to browser extensions, may look and feel like regular web applications, with a big-screen design and rich user interface. Both extensions and packaged web applications may bundle all their files into a single file that a user downloads and installs. This bundling means that, unlike ordinary web applications, extensions and packaged web applications do not need to depend on content from the web. Browser extensions, packaged web applications, and installable web applications may be distributed via a trusted web store, or via individual websites.

In some implementations, the API (and/or web API)) may be an element of a web browser as discussed above. However, in some implementations, the API (and/or web API)) may be an element of a web based operating system (Browser-OS). A Browser-OS may be a bootable version of a web browser (including a browser, a media player and a file system. The Browser-OS may store all of a user applications and data on the Web, as opposed to a local hard drive. The Browser-OS (e.g., Chrome-OS®) may replace a traditional operating system (e.g., Windows®).

Devices including a Browser-OS are typically resource limited (e.g., minimal memory, operate on battery power and the like) because web applications typically consume Web resources.

However, as discussed above, some applications are installable applications that function on a Browser-OS with a user experience similar to that of a typical program executed on a device with a conventional OS. The installable applications typically interact with a Browser-OS via an API or a runtime program that interacts with a Browser-OS similar to an API and/or may execute on top of a Browser-OS such that the runtime is configured to utilize a Browser-OS API. Typically when installable applications are not active, resources (including socket resources) allocated to the installable application are released to conserve the limited resources of a Browser-OS device.

In some example embodiments, the resources associated with a socket are released (e.g., paused) on the client machine while the socket remains open on a remote server. Accordingly, an API including socket functionality may be configured to pause sockets (e.g., release resources) on a client machine (e.g., based on an application configuration. In addition, the API may be configured to interact with a server (e.g., receive and acknowledge messages) when the server communicates with the client using the paused socket. For example, TCP defines several states, one of which is called "Established". In the established state, the socket is defined as having an open connection; data received can be delivered to the user. The established state is the normal state for the data transfer phase of the connection. Although not defined as a state in TCP, a socket may be closed. In some implementations, a paused socket may include the server being considered as in the "Established" state and the client machine may be considered as being in the "Closed" state.

Figure 1:
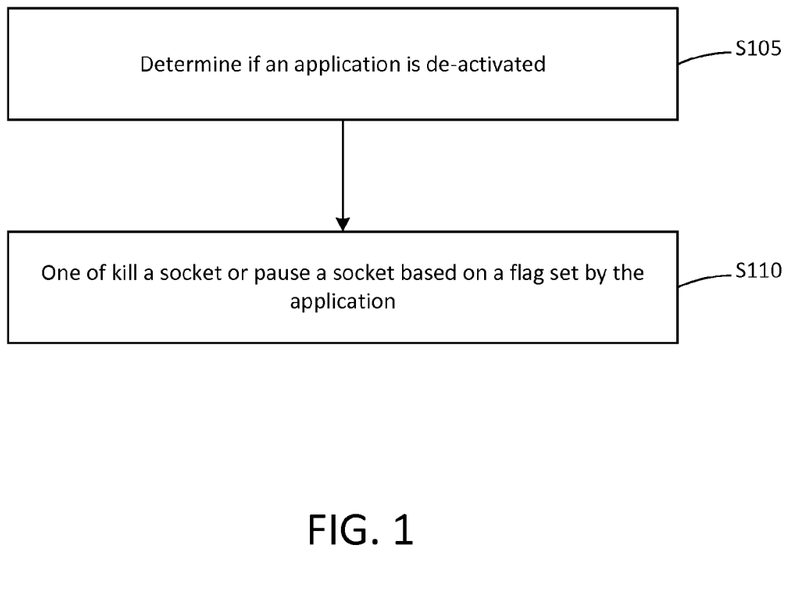
FIG. 1 is a flowchart of a method of managing a socket according to at least one example embodiment.
Figure 2:
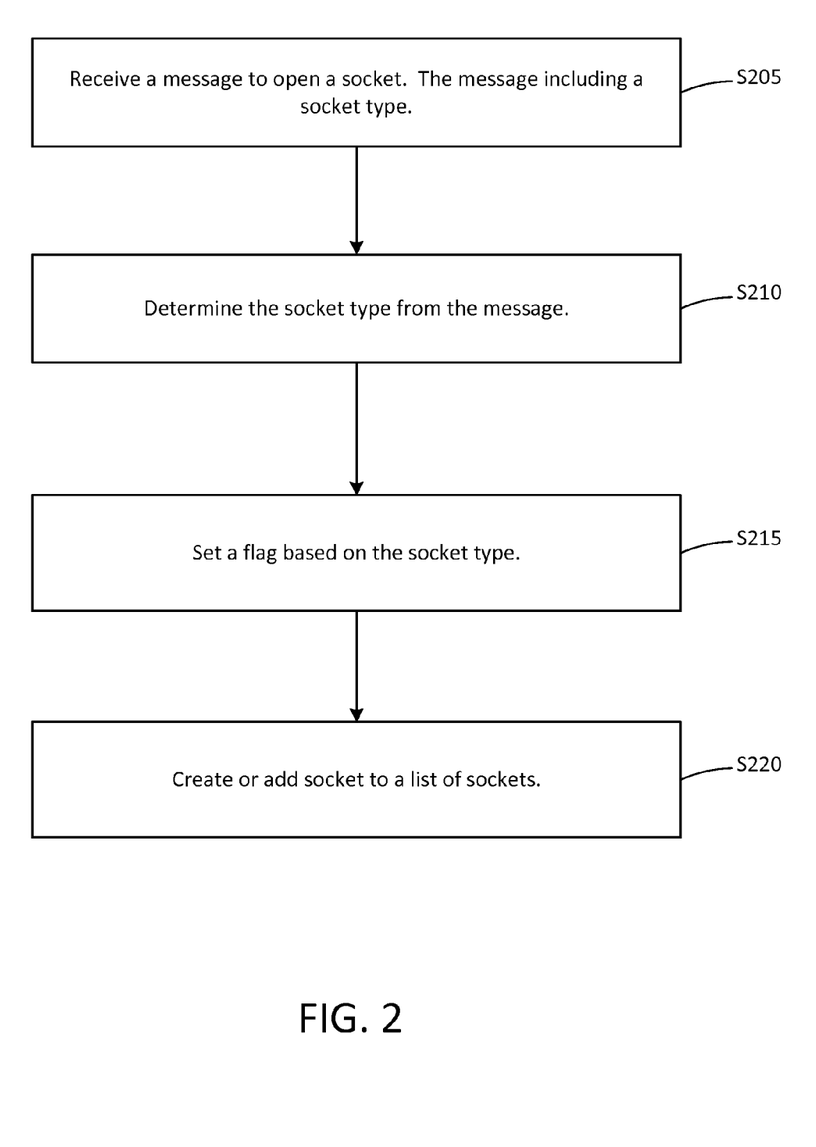
FIG. 2 is a flowchart of another method of managing a socket according to at least one example embodiment.
Figure 3:
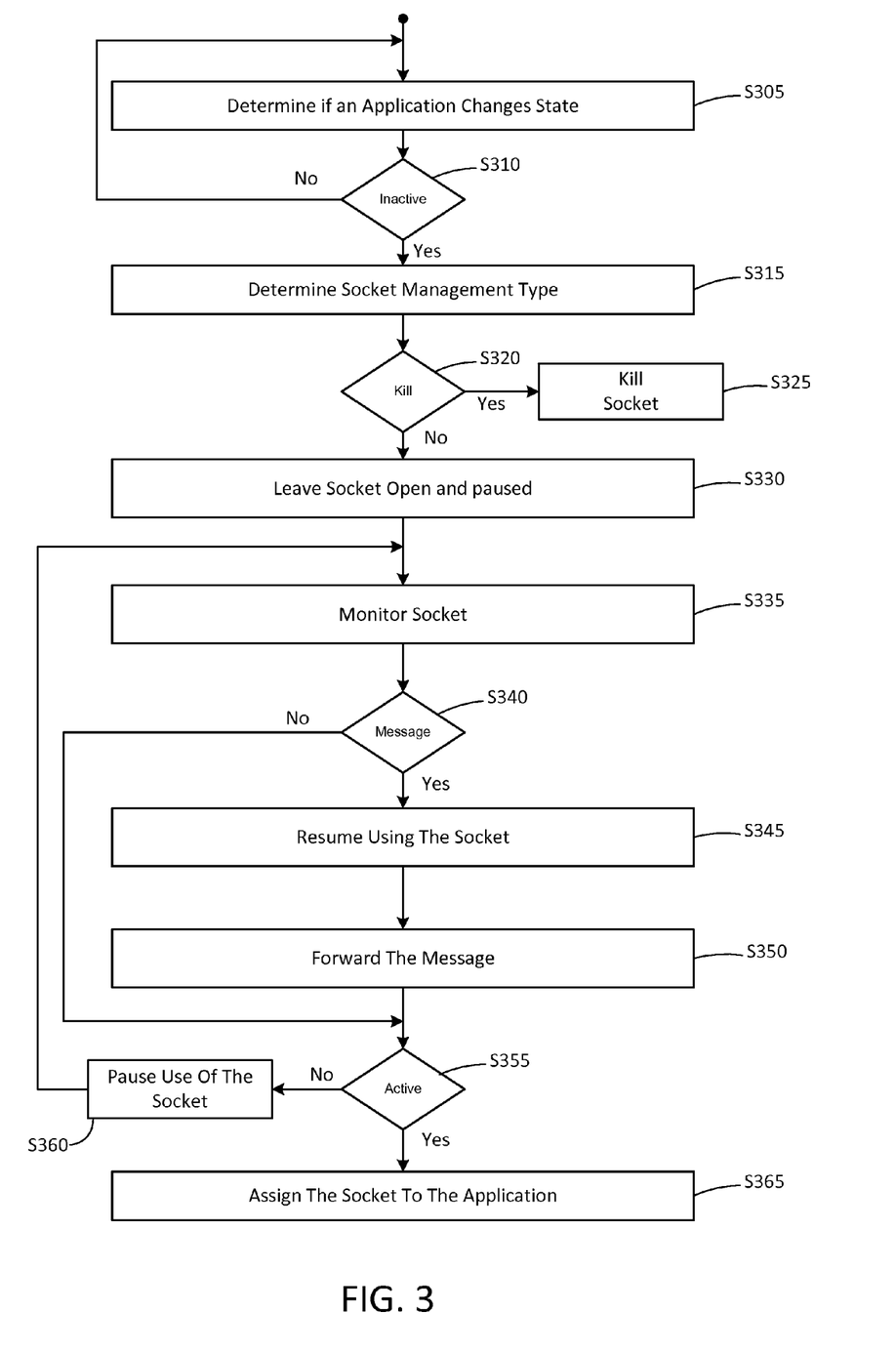
FIG. 3 is a flowchart of still another method of managing a socket according to at least one example embodiment.
Figure 5:
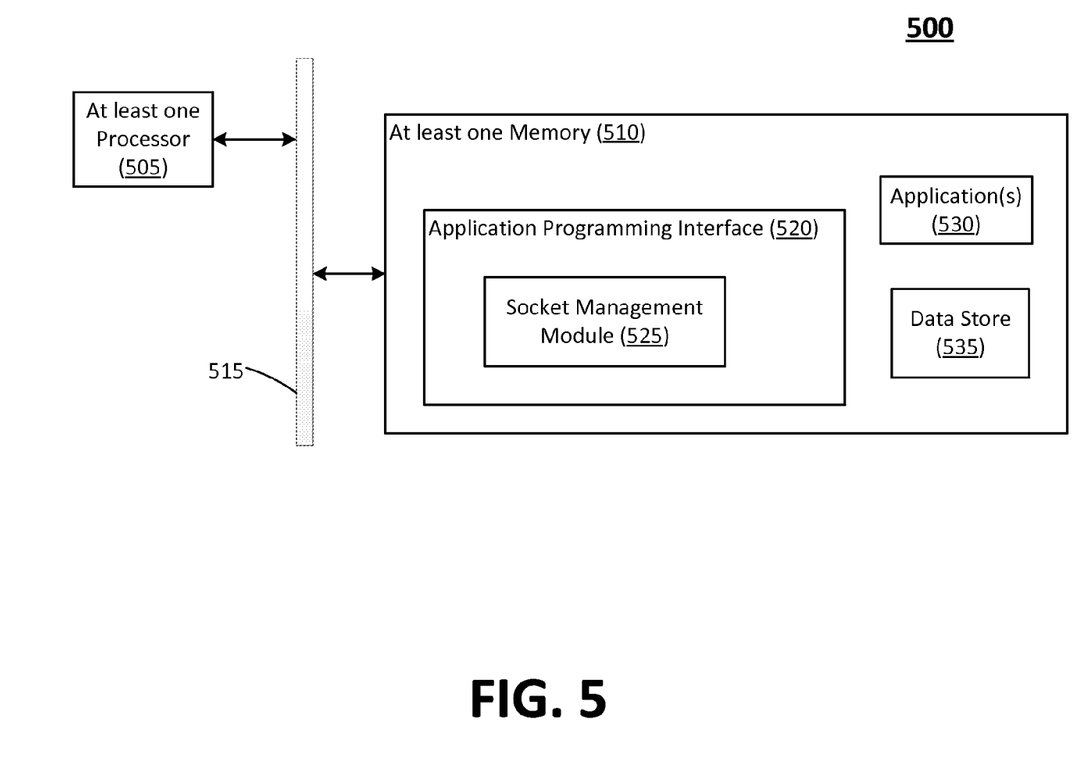
FIG. 5 is a schematic block diagram of an apparatus according to at least one example embodiment.

FIGS. 1-3 are flowcharts of methods according to example embodiments. The steps described with regard to FIGS. 1-3 may be performed due to the execution of software code stored in a memory (e.g., at least one memory 510 described below) associated with an apparatus (e.g., as shown in FIG. 5) and executed by at least one processor (e.g., at least one processor 505 described below) associated with the apparatus. However, alternative embodiments are contemplated such as a system embodied as a special purpose processor. Although the steps described below are described as being executed by a processor, the steps are not necessarily executed by a same processor. In other words, at least one processor may execute the steps described below with regard to FIGS. 1-3.

FIG. 1 is a flowchart of a method of managing a socket according to at least one example embodiment. As shown in FIG. 1, in step S105 an application is determined to be de-activated. For example, an application may be de-activated if the application is set as a background process. In a Browser-OS the application may be associated with a tab of the browser that is not in the foreground. In a Browser-OS the processor may (and/or may be configured to and/or include or be associated with an element configured to) detect or snoop an instruction to reduce or terminate resources associated with the application.

In step S110 the socket is one of killed or paused based on a flag set by the application. For example, the application may have a flag associated with the socket. A flag may be a key-value pairing. With regard to the socket associated with the application there may be one key-value pairing. For example, the key-value pairing may have, for example, a key of "socketmantype". Alternatively, there may be two key-value pairings. A first key-value pairing may have, for example, a key of "kill" and a second key-value pairing may have, for example, a key of "pause". A Boolean value (e.g., true, false, 0, 1) may be used as the associated value. If the flag indicates the socket should be killed (e.g., closed, terminated, and/or the like), the processor kills (and/or instructs the associated device to kill) the socket. Otherwise, the processor leaves the socket open and pauses the socket's operation. For example, pausing the socket's operation may include stopping the interaction between the application and the OS (e.g., a Browser-OS). For example, pausing the socket's operation may reduce resources consumed by the application.

FIG. 2 is a flowchart of another method of managing a socket according to at least one example embodiment. As shown in FIG. 2, in step S205 a message to open a socket is received. For example, an application (e.g., a packaged app or a natively operating application) may be opened or launched by a user of a device (e.g., a computer running a Browser-OS). The application may rely on data stored on a network device. Accordingly, as part of the open or launch routine, the application may request a socket be instantiated. For example, the application may communicate an open socket request in a message (e.g., a call to an API) to the OS.

The message may include a socket management type. For example, the message may have a format like socket.create (SocketType type, object options, function callback, Bool SocketManType). Where, type is a type of socket to create (e.g., TCP or UDP), options are options for the socket, callback is a function called when the socket has been created, SocketManType is socket management type (e.g. True=Kill and False=Pause).

In step S210 the socket management type from the message is determined. For example, after receiving the message to open a socket, the processor may read the message including reading the socket management type. Referring back to socket.create message (or API call), the processor reads the SocketManType value (e.g. True=Kill and False=Pause). Based on the socket management type value, the processor determines if the socket management type is a type Kill (e.g., close, terminate, or the like) or pause (e.g., maintain).

In step S215 a flag based on the socket management type is set. For example, the flag may be based on the determined socket management type. The flag may be a Boolean value (e.g., True or False, 0 or 1, and the like).

In step S220 a socket is added to a (newly created or existing) list of sockets. According to example embodiments, a list of sockets may be maintained for each application operating (e.g., active and/or inactive) on the device. A separate list may be maintained for each application (noting that an application may have one or more associated sockets). Alternatively, one list may be maintained that includes all active sockets (e.g., open and paused) with an association to an application. For example, the processor may store a list (e.g., a data table or XML file) to a memory (e.g., data store 540 described below) and add information associated with the socket to the list. Alternatively, if a list exists, the processor may add a new entry (e.g., record) to the list. The new entry may include information associated with the socket. The information associated with the socket may include, for example, a socket ID, a host name or IP address of the remote machine, a port of the remote machine, the socket management type, and/or the like.

FIG. 3 is a flowchart of still another method of managing a socket according to at least one example embodiment. As shown in FIG. 3, in step S305 whether or not an application changing state is determined. For example, the application may change state from closed to open, open to inactive, inactive to open, open to closed and the like.

In step S310 whether or not the application changed the state to inactive is determined. For example, an application may change state from an active (or open) to inactive if a window (e.g., browser page or window) in which the application is running is minimized, suspended, or unloaded (without closing or terminating). For example, an application may include an OnSuspend event or routine. When the OnSuspend event or routine executes, the application may be indicated as having changed a state from open to inactive. If the application changed state to inactive, processing continues to step S315. Otherwise processing returns to step S305.

In step S315 a socket management type associated with a socket for the application is determined. For example, a Socket ID for a socket associated with the application may be determined. Then the aforementioned list of sockets (for the application) may be retrieved and/or read. The socket may be looked-up or searched for in the list of sockets, using the Socket ID, and the information about the socket from the list of sockets may be retrieved and/or read.

In step S320 whether or not the socket type is kill is determined. For example, using the information about the socket from the list of sockets, a value associated with the SocketManType may be read. The value may be a Boolean value (e.g., True or False, 0 or 1). If the value is True, the socket type may be determined to be type kill (e.g., close, terminate, or the like). If the socket type is type kill, processing continues to step S325. Otherwise processing continues to step S330.

In step S325 the socket is killed (or torn down or closed). For example, killing the socket associated with the application may include terminating use of the socket on a user device executing the application and a network device communicating with the user device. For example, the socket between the network or remote device and user or client device may be killed. For example, a socket.destroy(integer socketId) or socket.disconnect(integer socketId) may be executed on the user or client device. Killing or terminating the socket may include communicating a message to the remote device. For example, a socket.destroy(integer socketId) message or command may be sent to the network or remote device resulting in the network or remote device killing or terminating the socket.

In step S330 the socket is left open and paused. For example, pausing the socket associated with the application includes ending use of the socket on the user or client device executing the application and leaving the socket open on a network device or server communicating with the user or client device. For example, the socket is left open with regard to the network device. In other words, any events regarding the socket and the network device may be processed as normal. Therefore, if data changes on the network device, data is received by the network device and/or data requires processing by the network device as relates to the socket, the network device will process the data. As a result, the network device may communicate data to the user device using the socket if the communication is part of normal processing. The network device leaves the socket open because the user device does not communicate a kill (e.g., a socket.destroy(integer socketId)) message or command to the network device. Further, if the socket is associated with a group (e.g., a multicast group), the network device maintains the group status open (e.g., messages broadcast to the group will be processed as normal). In other words, data broadcast to all group members will be forwarded over the socket to the user device using the socket.

For example, with regard to the user or client device, the socket is paused (e.g., closes or temporarily closes the socket) or leaves the socket open without any resources assigned to the socket. In other words, resources associated with the user device that are allocated to the socket may be released for use by other processes. Accordingly, on the user device, the socket may be killed (e.g., socket.destroy(integer socketId)) with regard to the API and the application. Alternatively, the socket may be paused or idled using some other command such that resources associated with the socket are substantially reduced.

In step S335 the socket is monitored. For example, the processor may poll the socket or receive messages over the socket. In one example, the processor may periodically read the socket. For example, the processor may execute a socket.read(integer socketId, integer bufferSize, function callback) command. Where socketId identifies the socket, bufferSize is the size of the buffer to read, and callback is a function that returns a result code for the read. In another example, the processor may periodically listen to the socket. For example, the processor may execute a socket.listen(integer socketId, string address, integer port, integer backlog, function callback) command. Where, socketId identifies the socket, address is the address of the local machine, port is the port of the local machine, backlog is the length of the socket's listen queue, and callback is a function called when the listen operation completes.

In step S340 whether or not a message associated with the socket is received is determined. For example, a message has been received via the socket if, while monitoring the socket (e.g., periodically listening or reading), a message associated with the socket is detected. For example, the socket.read command callback function may return a result code. The result code may indicate a message is in a buffer associated with the socket. If a message associated with the socket is received, processing continues to step S345. Otherwise processing continues to step S355.

In step S345 use of the socket is resumed. For example, as discussed above with regard to the user device, the socket may have been paused (e.g., closed with regard to the user device). Therefore, in order to resume use of the socket, an application associated with the socket may be determined. For example, as discussed above, information associated with the socket may be stored in a list (e.g., a data table or XML file). Therefore, the list may be searched for the socketID to determine the associated application. Accordingly, use of the socket may be resumed by opening (e.g., assigning resources to) the application associated with the socket so that in step S350 the message can be forwarded to the application. The application may be opened in the background (e.g., not shown or maximized on the display of the user device).

In step S355 whether or not the application is active may be determined. For example, after receiving the message the application may change state from inactive to active. For example, the message may indicate data ready to be read and processed. For example, the application may be an email application and the message may indicate new mail is available for download. As a result, in order to process information associated with the message, the application may change state to active. By contrast, the message may be informative, but not include information indicating further processing should occur. In this case, the application may remain inactive. Again using an email application as an example, the message may include a notification that an email was received by a recipient. In this example, the application need not perform any processing based on the message. Therefore, the application may remain inactive. If the application is active, processing continues to step S365. Otherwise processing continues to step S360.

In step S360 use of the socket is paused. For example, in order to conserve resources, the processor releases the resources assigned to the application in order to resume the socket and forward the message. As a result, the socket converts back to the paused mode and processing returns to step S335.

In step S365 the socket is assigned to the application. For example, upon determining that the application changes a state from the inactive state to the active state, information about the socket may be read from a stored list, the information being associated with the paused socket, generating a socket based on the read information, and assign the socket to the application. For example, the socket may be reopened and made available for data communications. According to example embodiments, assigning the socket to the application may include reopening (or reusing) the socket using all (or substantially all) of the settings of the socket that was paused (e.g., closed or temporarily closed) with regard to the user device. For example, as discussed above, information associated with the socket may be stored in a list (e.g., a data table or XML file). Therefore, the processor may search the list for the socketID and read all information about the socket that was stored in the list. The processor may open a socket and assign the socket to the application and use the same socketID (e.g., not assign a new socketID to the new socket). Further, the socket may be assigned the same settings as the paused socket. For example, the socket may be assigned settings which include, for example, a host name or IP address of the remote machine, a port of the remote machine, the socket management type, and the like. As a result, the user device and the remote or network device communicate using the socket as though the socket had not been paused (e.g., closed or temporarily closed) with regard to the user device.

Figure 4:
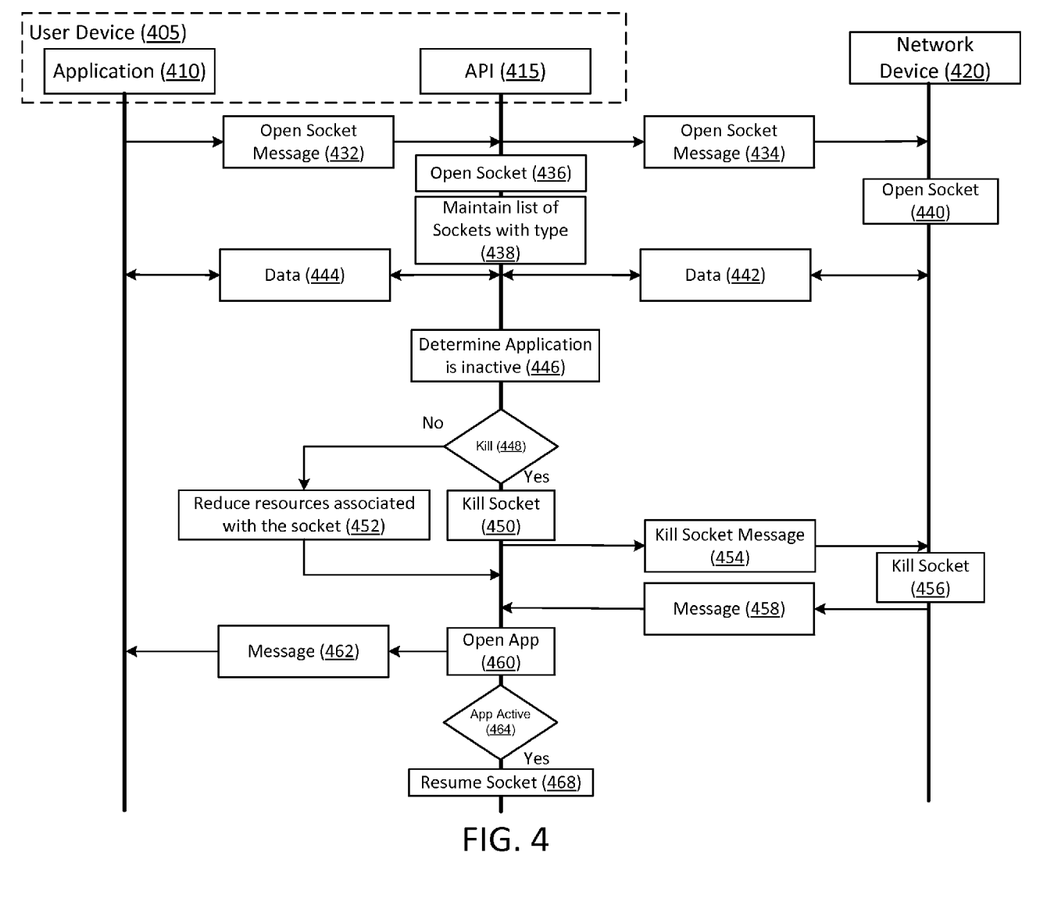
FIG. 4 is a signal flow block diagram according to at least one example embodiment.

FIG. 4 illustrates a signal flow block diagram according to at least one example embodiment. As shown in FIG. 4, signal flow is between a user device 405 and a remote or network device 420. Further, within the network device, signal flow is shown between an application 410 and an application programming interface (API) 415. The signal flow shown and described with regard to FIG. 4 is based on the methods described above with regard to FIGS. 1-3. Therefore, not all features will be described in detail for the sake of brevity.

Initially an open socket message (block 432) is communicated from the application 410 to the API 415. The open socket message (block 432) may include a socket management type. The open socket message may include information regarding a type of socket to open. For example, the message may have a format like socket.create(SocketType type, object options, function callback, Bool SocketManType). Where, type is a type of socket to create (e.g., TCP or UDP), options are options for the socket, callback is a function called when the socket has been created, SocketManType is socket management type (e.g. True=Kill and False=Pause). Accordingly, the application developer decides the socket management type at design/development time in order to assign the message variables as desired.

The API 415 communicates another open socket message (block 434) to the network device 420. In addition, the API 415 opens a socket (block 436), noting that sending the open socket message (block 434) may be a function of opening the socket (block 436), and maintains a list of sockets with the type of socket to open (block 438).

According to example embodiments, a list of sockets may be maintained for each application operating (e.g., active and/or inactive) on the device. A separate list may be maintained for each application (noting that an application may have one or more associated sockets). Alternatively, one list may be maintained that includes all active sockets (e.g., open and paused) with an association to an application. For example, the processor may store a list (e.g., a data table or XML file) to a memory (e.g., data store 540 described below) and add information associated with the socket to the list. Alternatively, if a list exists, the processor may add a new entry (e.g., record) to the list. The new entry may include information associated with the socket. The information associated with the socket may include, for example, a socket ID, a host name or IP address of the remote machine, a port of the remote machine, the socket management type, and the like.

With a socket open, data (and/or other types of information) may be communicated between the application 410 and the network device 420 (blocks 442 and 444) via the API 415. The API 415 determines that the application has become inactive (block 446). The API 415 then determines if the socket type for the application is a kill type (block 448). If the socket type is type kill, the API 415 kills the socket (block 450) (which may include deleting the socket from the list of sockets and/or deleting the list of sockets) and sends a kill socket message (block 454) to the network device 420. For example, a socket.destroy(integer socketId) message or command may be sent to the network device 420. The network device 420 then kills the socket (block 456). If the socket type is not type kill, the API 415 does not send a kill socket message to the network device 420. As a result, the network device 420 does not kill the socket. In other words, the network device 420 leaves the socket open and continues to manage the socket as if the application were still active. However, the API 415 pauses the socket (regarding the API 415 and the application 410) to conserve resources of the user device 405.

If the socket type is not a type kill, the API 415 reduce resources (on the user device) associated with the socket (block 452). In other words, the API 415 pauses (e.g., closes or temporarily closes) the socket or leaves the socket open without any resources assigned to the socket. While the socket is paused, a message (block 458) may be communicated to the API 415 from the network device 420. In one example, the processor may periodically read the socket. For example, the processor may execute a socket.read(integer socketId, integer bufferSize, function callback) command. Where socketId identifies the socket, bufferSize is the size of the buffer to read, and callback is a function that returns a result code for the read. In another example, the processor may periodically listen to the socket. For example, the processor may execute a socket.listen(integer socketId, string address, integer port, integer backlog, function callback) command. Where, socketId identifies the socket, address is the address of the local machine, port is the port of the local machine, backlog is the length of the socket's listen queue, and callback is a function called when the listen operation completes. The API 415 then opens the application (block 460) and forwards the message (block 462) to the application 410.

If, as a result of the message the application 410 becomes active (block 464), the API 415 reassigns the socket (block 468). For example, the socket may be reopened and made available for data communications. According to example embodiments, reassigning the socket to the application may include reopening (or reusing) the socket using all (or substantially all) of the settings of the socket that was paused (e.g., closed) with regard to the user device.

For example, as discussed above, information associated with the socket may be stored in a list (e.g., a data table or XML file). Therefore, the processor may search the list for the socketID and read all information about the socket that was stored in the list. The processor may open a socket and assign the socket to the application and use the same socketID (e.g., not assign a new socketID to the new socket). Further, the socket may be assigned the same settings as the paused socket. For example, the socket may be assigned settings which include, for example, a host name or IP address of the remote machine, a port of the remote machine, the socket management type, and the like. As a result, the user device and the remote or network device communicate using the socket as though the socket had not been paused (e.g., closed or temporarily closed) with regard to the user device.

FIG. 5 illustrates a block diagram of an apparatus according to at least one example embodiment. As shown in FIG. 5, the apparatus 500 includes at least one processor 505 and at least one memory 510. The at least one processor 505 and the at least one memory 510 are communicatively coupled via bus 515. The apparatus 500 may be, for example, an element of a computing device (e.g., a cloud computing device, a server or a personal computer.

In the example of FIG. 5, the apparatus 500 may be at least one computing device and should be understood to represent virtually any computing device configured to perform the methods described herein. As such, the apparatus 500 may be understood to include various standard components which may be utilized to implement the techniques described herein, or different or future versions thereof. By way of example, the apparatus 500 is illustrated as including the at least one processor 505, as well as the at least one memory 510 (e.g., a non-transitory computer readable storage medium) respectively.

Thus, as may be appreciated, the at least one processor 505 may be utilized to execute instructions stored on the at least one memory 510, so as to thereby implement the various features and functions described herein, or additional or alternative features and functions. Of course, the at least one processor 505 and the at least one memory 510 may be utilized for various other purposes. In particular, it may be appreciated that the at least one memory 510 may be understood to represent an example of various types of memory and related hardware and software which might be used to implement any one of the modules described herein. Systems and/or methods described above and/or below may include data and/or storage elements. The data and/or storage elements (e.g., data base tables) may be stored in, for example, the at least one memory 510.

As shown in FIG. 5, the at least one memory 510 includes an application programming interface (API) 520 which, in-turn, includes a socket management module 525, the at least one memory 510 further includes application(s) 530 and a data store 535. The socket management module 525 may be configured to implement the methods described above with regard to FIGS. 1-3 and implement the actions performed by API 415, each described in more detail above and not described further for the sake of brevity.

The API 520 may be an element of a browser, a Browser-OS and/or a runtime. Therefore, the API 520 may be configured to interact with a web application, packaged app, and/or a natively operating application. Therefore, the API 520 may be configured to manage a socket associated with any one or more of a web application, packaged app, and/or a natively operating application and implement the various features and functions described herein. Accordingly, the application(s) 530 may include an installed packaged app and/or a natively operating application and/or include some portion of a web application configured to operate on a user device (e.g., user device 405). In addition, data store 535 may be configured to store application data associated with a web application, packaged app, and/or a natively operating application. Still further, data store 535 may be configured to store one or more lists of sockets associated with the application(s) 530.

As will be appreciated, the apparatus 500 illustrated in FIG. 5 may be implemented as an element of and/or an extension of the generic computer device 600 and/or the generic mobile computer device 650 described below with regard to FIG. 6. Alternatively, or in addition to, the apparatus 500 illustrated in FIG. 5 may be implemented in a separate system from the generic computer device 600 and/or the generic mobile computer device 650 having some or all of the features described below with regard to the generic computer device 600 and/or the generic mobile computer device 650.

Figure 6:
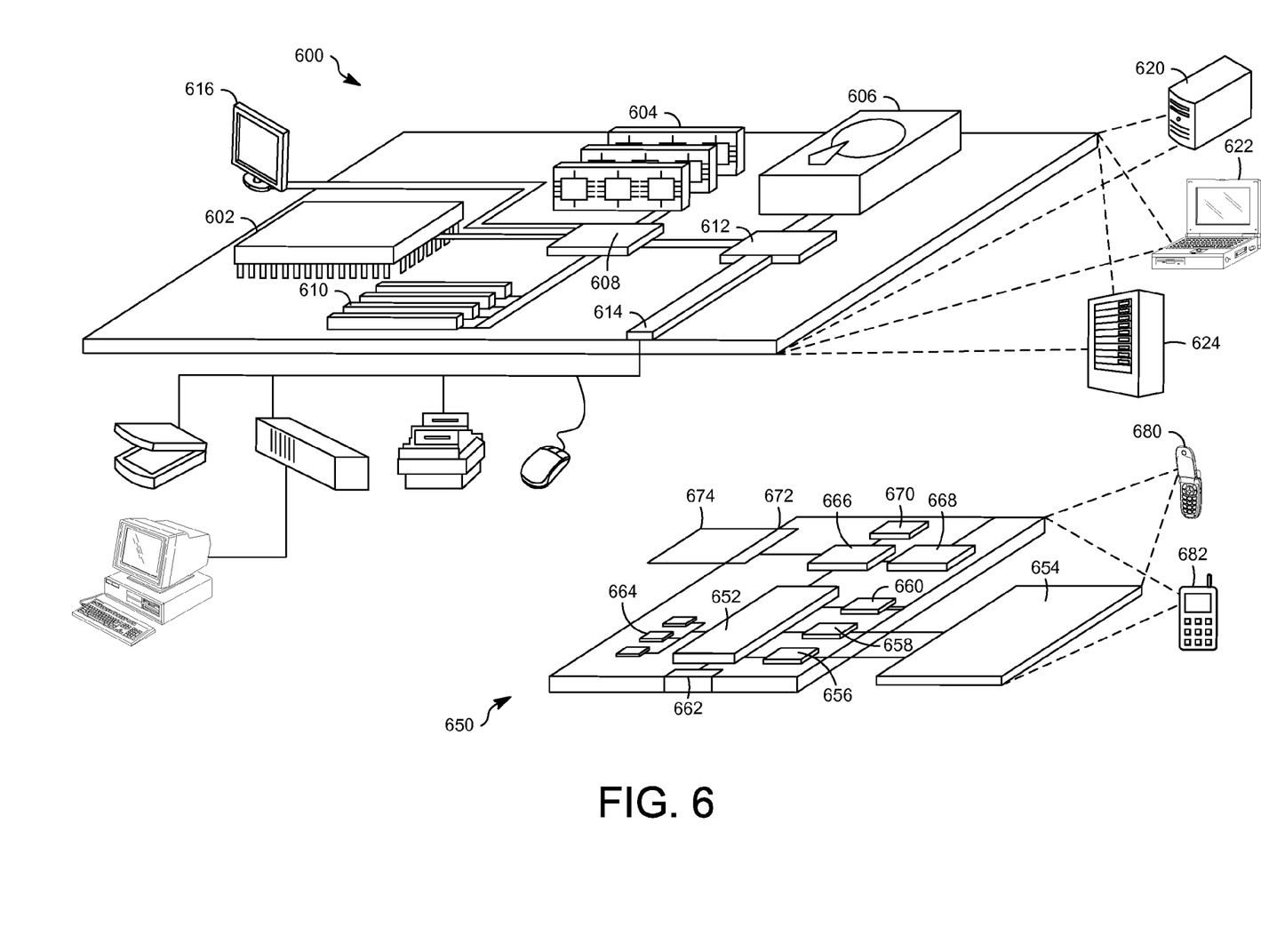
FIG. 6 is a schematic block diagram of a computer device and a mobile computer device that can be used to implement the techniques described here.

FIG. 6 shows an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, LTE, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A computer implemented method comprising:
   determining, by at least one processor executing code segments stored on a non-transitory computer readable medium, if an application is de-activated; and
   upon determining the application is de-activated, one of killing, by the at least one processor, a socket associated with the application or pausing, by the at least one processor, the socket based on a flag set by the application, wherein pausing the socket associated with the application includes,
      ending use of the socket on a user device executing the application,
      leaving the socket open on a network device communicating with the user device, and
      configuring the user device to respond to a communication from the network device via the socket.

2. The method of claim 1, wherein the application is de-activated if the application changes a state from an active state to an inactive state.

3. The method of claim 1, further comprising:
   determining a socket management type associated with the socket associated with the application, wherein the socket is killed or paused based on the socket management type.

4. The method of claim 1, wherein killing the socket associated with the application includes terminating use of the socket on a user device executing the application and terminating use of the socket on a network device communicating with the user device.

5. The method of claim 1, wherein pausing the socket associated with the application includes reducing resources associated with a user device executing the application, the resources being allocated to the socket.

6. The method of claim 1, further comprising:
   determining if the application changes a state from an inactive state to an active state; and
   upon determining that the application changes a state from the inactive state to the active state:
      reading information associated with the socket from a stored list, the information being associated with the paused socket;
      generating a socket based on the read information; and
      assigning the socket to the application.

7. The method of claim 1, further comprising:
   receiving, by a user device, a message associated with the socket;
   assigning resources to the application; and
   forwarding the message to the application.

8. The method of claim 1, wherein the application is a packaged application.

9. The method of claim 1, wherein the application is a natively operating application.

10. A computer-implemented method comprising:
    receiving a message from an application, the message including a request to open a socket;
    reading, from the message, by at least one processor executing code segments stored on a non-transitory computer readable medium, a socket management type;
    setting, by the least one processor executing, a flag based on the socket management type; and
    storing information about the socket in a list of sockets, the information including the flag, information associated with an open socket and application information, the application information configured to be used, by the processor, to respond to a communication from a network device via the socket when the socket is in a paused state.

11. The method of claim 10, wherein the information further includes a socket ID, a host name or IP address of a remote machine, and a port of a remote machine.

12. The method of claim 10, further comprising:
    determining if the application changes a state from an inactive state to an active state; and
    upon determining that the application changes a state from the inactive state to the active state:
       reading the information associated with the socket from the list of sockets;
       generating a socket based on the read information; and
       assigning the socket to the application.

13. A non-transitory computer-readable storage medium having stored thereon computer executable program code which, when executed on a computer system, causes the computer system to perform steps comprising:
    determining, by at least one processor executing code segments stored on a non-transitory computer readable medium, if an application is de-activated; and
    upon determining the application is de-activated, one of killing, by the at least one processor, a socket associated with the application or pausing, by the at least one processor, the socket based on a flag set by the application, wherein pausing the socket associated with the application includes, ending use of the socket on a user device executing the application, leaving the socket open on a network device communicating with the user device, and configuring the user device to respond to a communication from the network device via the socket.

14. The non-transitory computer-readable storage medium of claim 13, wherein the application is de-activated if the application changes a state from an active state to an inactive state.

15. The non-transitory computer-readable storage medium of claim 13, wherein the steps further comprise:

determining a socket management type associated with the socket associated with the application, wherein the socket is killed or paused based on the socket management type.

16. The non-transitory computer-readable storage medium of claim 13, wherein pausing the socket associated with the application includes reducing resources associated with a user device executing the application, the resources being allocated to the socket.

17. The non-transitory computer-readable storage medium of claim 13, wherein the steps further comprise:

determining if the application changes a state from an inactive state to an active state; and upon determining that the application changes a state from the inactive state to the active state:

reading information associated with the socket from a stored list, the information being associated with the paused socket;

generating a socket based on the read information; and assigning the socket to the application.

18. The non-transitory computer-readable storage medium of claim 13, wherein the steps further comprise:

receiving, by a user device, a message associated with the socket;

assigning resources to the application; and forwarding the message to the application.

* * * * *